(12) United States Patent
Nakazawa

(10) Patent No.: US 11,436,436 B2
(45) Date of Patent: Sep. 6, 2022

(54) DATA AUGMENTATION SYSTEM, DATA AUGMENTATION METHOD, AND INFORMATION STORAGE MEDIUM

(71) Applicant: RAKUTEN GROUP, INC., Tokyo (JP)

(72) Inventor: Mitsuru Nakazawa, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 247 days.

(21) Appl. No.: 16/885,270

(22) Filed: May 28, 2020

(65) Prior Publication Data

US 2020/0380302 A1 Dec. 3, 2020

(30) Foreign Application Priority Data

May 31, 2019 (JP) .............................. JP2019-102682

(51) Int. Cl.
*G06K 9/62* (2022.01)
*G06N 3/08* (2006.01)
*G06N 3/04* (2006.01)
*G06V 10/40* (2022.01)

(52) U.S. Cl.
CPC ............ *G06K 9/6257* (2013.01); *G06N 3/04* (2013.01); *G06N 3/08* (2013.01); *G06V 10/40* (2022.01); *G06K 9/6263* (2013.01)

(58) Field of Classification Search
CPC ...... G06K 9/6257; G06K 9/46; G06K 9/6263; G06K 9/6273; G06N 3/04; G06N 3/08; G06N 7/005; G06N 3/0454

USPC ......................................................... 382/157
See application file for complete search history.

(56) References Cited

U.S. PATENT DOCUMENTS

| | | | |
|---|---|---|---|
| 2016/0358074 A1* | 12/2016 | Latapie | G06N 3/088 |
| 2018/0107928 A1* | 4/2018 | Zhang | G06N 3/0454 |
| 2018/0373999 A1 | 12/2018 | Xu | |
| 2019/0354895 A1* | 11/2019 | Vasudevan | G06N 3/0454 |
| 2020/0065992 A1* | 2/2020 | Sung | G06K 9/6267 |
| 2020/0134469 A1* | 4/2020 | Choo | G06F 17/15 |
| 2020/0160040 A1* | 5/2020 | Ma | G06K 9/00906 |
| 2020/0167644 A1* | 5/2020 | Lin | G06F 30/20 |
| 2020/0174840 A1* | 6/2020 | Zhao | G06N 3/084 |

FOREIGN PATENT DOCUMENTS

JP 2019032821 A 2/2019

OTHER PUBLICATIONS

Selvaraju, "Grad-CAM: Visual Explanations from Deep Networks via Gradient-Based Localization" Arxiv 2017. (Year: 2017).*

(Continued)

*Primary Examiner* — Juan A Torres
(74) *Attorney, Agent, or Firm* — HEA Law PLLC

(57) ABSTRACT

Provided is a data augmentation system including at least one processor, the at least one processor being configured to: input, to a machine learning model configured processor to perform recognition, input data; identify a feature portion of the input data to serve as a basis for recognition by the machine learning model in which the input data is used as input; acquire processed data by processing at least a part of the feature portion; and perform data augmentation based on the processed data.

16 Claims, 10 Drawing Sheets

(56) References Cited

OTHER PUBLICATIONS

Zhou, "Learning Deep Features for Discriminative Localization" Arxiv 2015. (Year: 2015).*
DeVries, "Improved regularization of convolutional neural networks with cutout." arXiv preprint arXiv: 1708.04552, 2017 (Year: 2017).*
Pathak, "Context encoders: Feature learning by inpainting" In CVPR, pp. 2536-2544, 2016 (Year: 2016).*
Office Action dated Aug. 25, 2020, for corresponding JP Patent Application No. 2019-102682 with partial English translation.
Akira Sekizawa et al, "Learning of road sign recognizers using artificially generated road scenes", IEICE Technical Research Report [online], Japan, Institute of Electronics, Dec. 6, 2018, vol. 118 No. 362, pp. 73-78.
Kunihiro Yasuda, "How to raise My Artificial Intelligence", Interface, Japan, CQ Publishing Co. Ltd, Dec. 1, 2018, vol. 44, No. 12, pp. 20-37.
Office Action dated Nov. 17, 2020, for corresponding JP Patent Application No. 2019-102682 with partial English translation.
"Free yourself from manual work!—Development of auto-annotation tool", Qiita, Apr. 2, 2019 [retrieved on Nov. 6, 2020], URL, https://qiita.com/shinmura0/items/60a84ee24f9fb4546657, pp. 1-18; For concise explanation of relevance see the partial translation of the office action dated Nov. 17, 2020, and the description of cited document 2.
Kazunori Onishi et al., "Training data synthesis for deep learning", FIT 2015, 14th Forum on Information Technology, Lecture Paper, Information Processing Society of Japan, Aug. 24, 2015, vol. 3, pp. 443-446. For concise explanation of relevance see the partial translation of the office action dated Nov. 17, 2020, and the description of cited document 4.
Terrance DeVries and Graham W. Taylor "Improved Regularization of Convolutional Neural Networks with Cutout" arXiv preprint arXiv: 1708.04552, Nov. 29, 2017.

* cited by examiner

FIG.6

| TEACHER IMAGE | CLASSIFICATION INFORMATION |
|---|---|
| 00001.jpg | DOG |
| 00002.jpg | DOG |
| 00003.jpg | DOG |
| ... | ... |
| 10001.jpg | CAT |
| 10002.jpg | CAT |
| 10003.jpg | CAT |
| ... | ... |

DS

DATA AUGMENTATION SYSTEM, DATA AUGMENTATION METHOD, AND INFORMATION STORAGE MEDIUM

CROSS-REFERENCE TO RELATED APPLICATION

The present application claims priority from Japanese application JP 2019-102682 filed on May 31, 2019, the content of which is hereby incorporated by reference into this application.

BACKGROUND OF THE INVENTION

1. Field of the Invention

The embodiments disclosed herein relate to a data augmentation system, a data augmentation method, and an information storage medium.

2. Description of the Related Art

There have been known machine learning models using supervised machine learning. For example, in the literature "T. Devries and G. W. Taylor. 'Improved regularization of convolutional neural networks with cutout.' arXiv preprint arXiv: 1708.04552, 2017.5", there is described a technology in which a new teacher image is acquired by performing mask processing on a portion randomly selected from a teacher image, to thereby implement data augmentation.

SUMMARY OF THE INVENTION

However, even when the portion on which the mask processing has been performed is randomly selected as in the above-mentioned literature, the portion to be learned may be masked or a portion that is not to be learned may not be masked, which is not efficient.

In response to the above-mentioned issues, according to at least one aspect of the present invention, there is provided a data augmentation system including at least one processor, the at least one processor being configured to: input, to a machine learning model configured to perform recognition, input data; identify a feature portion of the input data to serve as a basis for recognition by the machine learning model in which the input data is used as input; acquire processed data by processing at least a part of the feature portion; and perform data augmentation based on the processed data.

According to at least one aspect of the present invention, there is provided a data augmentation method including: inputting, to a machine learning model configured to perform recognition, input data; identifying a feature portion of the input data to serve as a basis for recognition by the machine learning model in which the input data is used as input; acquiring processed data by processing at least a part of the feature portion; and performing data augmentation based on the processed data.

According to at least one aspect of the present invention, there is provided an information storage medium having stored thereon a program for causing a computer to: input, to a machine learning model configured to perform recognition, input data; identify a feature portion of the input data to serve as a basis for recognition by the machine learning model in which the input data is used as input; acquire processed data by processing at least a part of the feature portion; and perform data augmentation based on the processed data.

BRIEF DESCRIPTION OF THE DRAWINGS

FIG. 6 is a table for showing a data storage example of a teacher data set.

DETAILED DESCRIPTION OF THE INVENTION

1. Overall Configuration of Data Augmentation System

Figure 1:
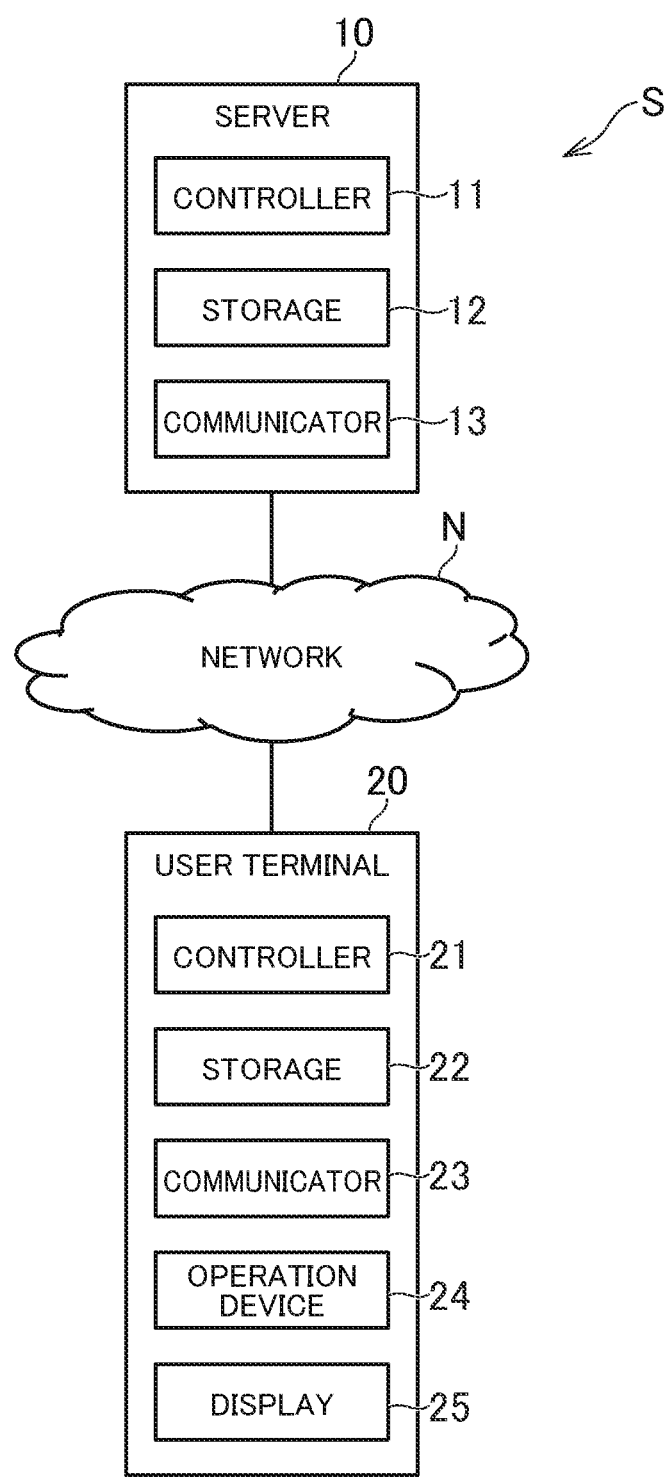
FIG. 1 is a diagram for illustrating an overall configuration of a data augmentation system according to at least one embodiment of the present invention.

Now, a data augmentation system according to at least one exemplary embodiment of the present invention is described. FIG. 1 is a diagram for illustrating an overall configuration of the data augmentation system. As illustrated in FIG. 1, a data augmentation system S includes a server 10 and a user terminal 20, each of which can be connected to a network N, for example, the Internet. In FIG. 1, there is illustrated one server 10 and one user terminal 20, but there may be a plurality of each of those.

The server 10 is a server computer. The server 10 includes a controller 11, a storage 12, and a communicator 13. The controller 11 includes at least one microprocessor. The controller 11 executes processing in accordance with programs and data stored in the storage 12. The storage 12 includes a main memory and an auxiliary memory. For example, the main memory is a volatile memory, for example, a RAM, and the auxiliary memory is a non-volatile memory such as a ROM, an EEPROM, a flash memory, or a hard disk drive. The communicator 13 is a communication interface for wired communication or wireless communication, and performs data communication via the network N.

The user terminal 20 is a computer to be operated by a user. For example, the user terminal 20 is a cell phone (including smartphones), a portable information terminal (including tablet computers), or a personal computer. In at least one embodiment, the user terminal 20 includes a controller 21, a storage 22, a communicator 23, an operation device 24, and a display 25. The physical configuration of each of the controller 21, the storage 22, and the communicator 23 may be the same as those of the controller 11, the storage 12, and the communicator 13, respectively.

The operation device 24 is an input device, and is, for example, a pointing device such as a touch panel and a mouse, a keyboard, or a button. The operation device 24 transmits details of operation by the user to the controller 21. The display 25 is, for example, a liquid crystal display or an organic EL display. The display 25 displays an image in accordance with an instruction of the controller 21.

Programs and data to be described as being stored into the storages 12 and 22 may be supplied thereto via the network N. Further, the respective hardware configurations of the computers described above are not limited to the above-mentioned examples, and various types of hardware can be applied thereto. For example, the hardware configuration may include a reader (e.g., an optical disc drive or a memory card slot) configured to read a computer-readable information storage medium, or an input/output device (e.g., a USB port) configured to input and output data to/from an external device. For example, the program and the data stored in the information storage medium may be supplied to each of the computers through intermediation of the reader or the input/output device.

2. Overview of Data Augmentation System

The data augmentation system S of at least one embodiment is configured to identify a feature portion of input data input to a machine learning model, and to perform data augmentation based on processed data obtained by processing at least a part of the feature portion.

The machine learning model is a model learned by supervised machine learning. The machine learning model is configured to perform recognition based on the input data. In the present application, "recognition" may be a concept including analysis, understanding, classification, or identification of the input data, and including detecting something from the input data and identifying the position of something. The machine learning model can perform any type of recognition, for example, image recognition, character recognition, voice recognition, recognition of human behavior patterns, or recognition of phenomena in the natural world. When used in the classification of the input data, the machine learning model may be referred to as "classification learner".

In at least one embodiment, as an example of the recognition performed by the classification learner, there is described classification of input data. The machine learning model outputs, from among a plurality of classifications, at least one classification to which the input data belongs. For example, for each learned classification, the machine learning model outputs a score indicating a probability of the input data belonging to the classification. Further, for example, the machine learning model outputs data from which a feature portion is identifiable. This data is described later. The machine learning model includes programs and parameters, and the parameters are adjusted by learning processing. Various known methods can be applied as the machine learning itself, and for example, a convolutional neural network (CNN), a residual network (ResNet), or a recurrent neural network (RNN) can be used.

The input data is data to be input to the machine learning model. In other words, the input data is the data to be processed (recognized) by the machine learning model. As in the case described in at least one embodiment, in a case where the machine learning model classifies the input data, the input data is data to be classified. The input data may have any data format, for example, an image, a moving image, text, a numerical value, a document, a sound, or a combination thereof.

For example, when the input data is an image or a moving image, an object shown in the image or moving image is classified by the machine learning model. In the case of an image or a moving image photographed by a camera, the object is the subject of the image, and in the case of computer graphics (CG), the object is a 3D model or an illustration. As another example, when the input data is text or a document, the content written in the text or the document is classified by the machine learning model. As yet another example, when the input data is audio, the content or the speaker indicated by the audio is classified by the machine learning model.

In at least one embodiment, there is described a case in which the machine learning model calculates a feature amount of the input data, but the feature amount may be calculated by a program other than the machine learning model. In such a case, the feature amount is input to the machine learning model, and therefore the feature amount corresponds to the input data.

The feature portion is a portion that is a feature of the input data. In other words, the feature portion is a portion in which a learned feature appears in the machine learning model. The feature portion can also be referred to as a portion focused on by the machine learning model or a portion to serve as a basis for classification by the machine learning model. In the input data, only one feature portion may exist, or a plurality of feature portions may exist.

For example, when the input data is an image or a moving image, a portion in which a feature of the object (for example, a shape feature or a color feature) appears corresponds to the feature portion. As another example, when the input data is text or a document, a portion in which a distinctive character string (for example, a predetermined keyword) is described corresponds to a feature portion. As yet another example, when the input data is audio data, a portion in which distinctive audio data (for example, a predetermined waveform) appears corresponds to a feature portion.

The term "processing" refers to changing or deleting data content. Processing can also be referred to as "editing". The entire feature portion may be processed, or only a part of the feature portion may be processed. As another example, when the input data is an image or a moving image, changing a value such as a pixel value, brightness, or a transparency level, hiding a part of an area, or cutting out a part of an area corresponds to the processing. As yet another example, when the input data is text or a document, changing or deleting a character string, a table, a diagram, or the like corresponds to the processing. For example, when the input data is audio data, changing or deleting a waveform corresponds to the processing.

The processed data is the data generated by processing at least a part of the feature portion. In other words, the processed data is the data obtained after the input data has been processed. Of the processed data, the processed portion is different from the input data, and the unprocessed portion is the same as the input data. For example, when the input data is an image or a moving image, an image or a moving image obtained by processing at least one pixel corresponds to the processed data. As another example, when the input data is text or a document, text or a document obtained by processing at least one character string corresponds to the processed data. As yet another example, when the input data is audio data, the data obtained by processing at least a part of the waveform corresponds to the processed data.

The term "data augmentation" refers to increasing the number of pieces of teacher data. In other words, data augmentation means augmenting the teacher data, diversifying the teacher data, or padding the teacher data. For example, generation of new teacher data by using existing teacher data corresponds to data augmentation. Data augmentation may be performed by adding teacher data to the teacher data set described later, or by newly generating a teacher data set different from the existing teacher data set.

The teacher data is data to be used in the machine learning. The teacher data may also be referred to as "learning data". For example, the teacher data is data in which data having the same format as that of the input data and a "correct" label (annotation) are paired. In at least one embodiment, the machine learning model classifies the input data, and therefore the label is an example of information for identifying the classification of the input data. For example, when the input data is an image or a moving image, the teacher data is data in which the image or the moving image, and a label indicating the classification of the object are paired. The teacher data can also be referred to as "input/output pairs" or "question/answer pairs". As another example, when the input data is text or a document, the teacher data is data in which the text or the document, and a label indicating the classification of the written content are paired. As yet another example, when the input data is audio data, the teacher data is a pair of the audio and a label indicating the classification of the content or the speaker of the audio.

In general, in machine learning, learning processing is executed by using a large number of pieces of teacher data. In at least one embodiment, a group of the plurality of pieces of teacher data is referred to as "teacher data set, and each piece of the data included in the teacher data set is referred to as "teacher data". For this reason, the term "teacher data" as used in at least one embodiment means the above-mentioned pairs, and the teacher data set means a group of pairs.

In at least one embodiment, the processing of the data augmentation system S is described by taking as an example a case in which the input data is an image and the machine learning model classifies an object shown in the image. In the following description, the input data is referred to as "input image", and the processed data is referred to as "processed image". For this reason, the term "input image" as used in at least one embodiment can be read as "input data", and the term "processed image" can be read as "processed data".

For example, the user prepares at least one teacher image for each classification to be learned. When a machine learning model for classifying animals such as dogs and cats is taken as an example, the user prepares teacher data in which a teacher image in which an animal is photographed and classification information indicating the classification of the animal are paired. The classification information may be any information from which the classification is identifiable, and may be, for example, an ID for uniquely identifying the classification, or a character string representing the classification.

Basically, when there is more teacher data included in the teacher data set, more kinds of features can be learned by the machine learning model, and hence the accuracy of the machine learning model is improved. However, it is very troublesome and difficult for a user to prepare a large number of pieces of teacher data by users themselves.

Therefore, in at least one embodiment, the user prepares only a certain number (for example, about 10 pieces to 100 pieces) of pieces of teacher data, and the data augmentation is performed on the data augmentation system S side.

Figure 2:
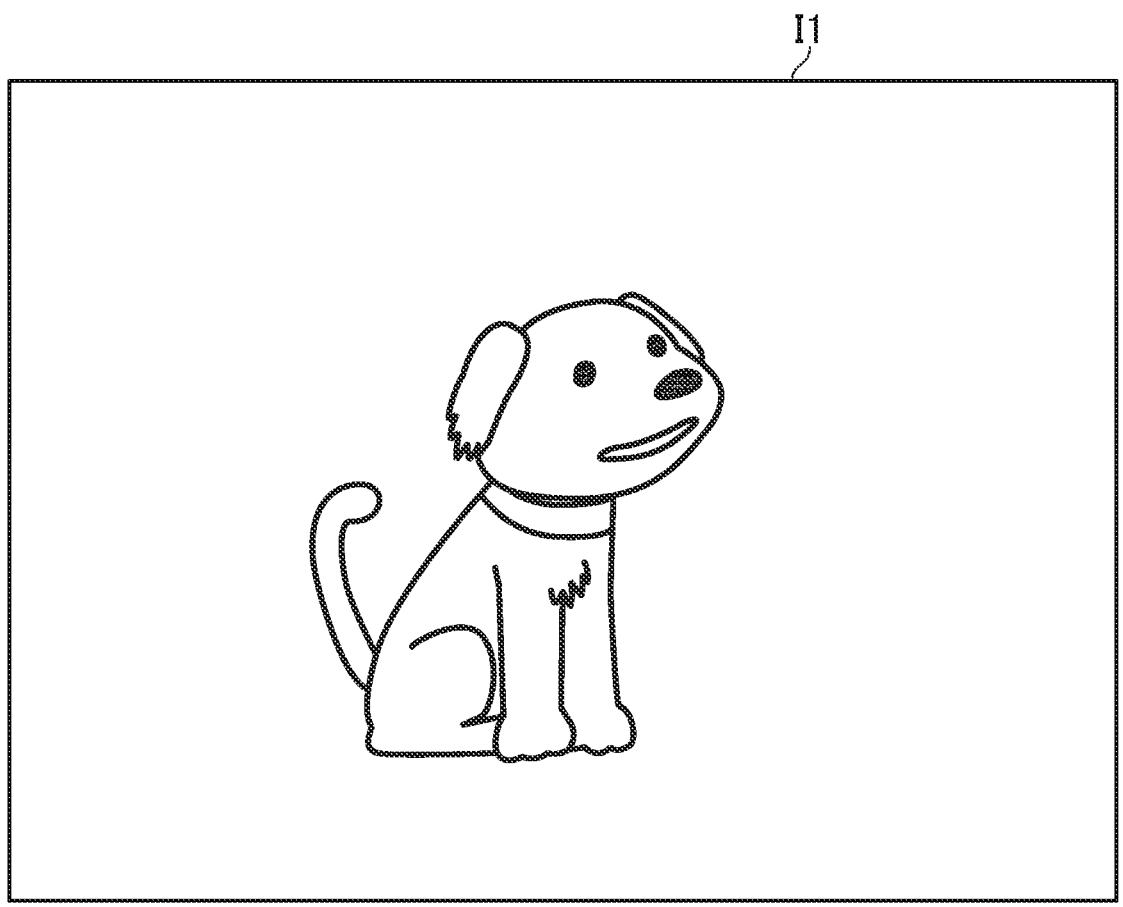
FIG. 2 is a diagram for illustrating an example of a teacher image included in teacher data.

FIG. 2 is a diagram for illustrating an example of the teacher image included in the teacher data. As illustrated in FIG. 2, a teacher image I1 includes a dog, which is one of the classifications to be learned. For example, the user creates, as the teacher data, a pair of the teacher image I1 and classification information indicating a dog. The user also prepares teacher images for other classifications, for example, cats, and creates pairs of the teacher image and the classification information as the teacher data.

The user prepares a certain number of pieces of teacher data to create a teacher data set as described above. For example, the user operates the user terminal 20 to upload the teacher data set to the server 10 and cause the server 10 to learn the machine learning model. At this point, the machine learning model is learned based on a certain number of pieces of teacher data, and hence the input image can be classified with a certain level of accuracy. However, the number of pieces of teacher data is not very large. The machine learning model is therefore not particularly accurate, and hence may not be able to learn detailed features.

Therefore, the data augmentation system S acquires a new teacher image by processing, from among learned teacher images, the feature portion to serve as the basis for classification by the machine learning model. The basis for classification is a portion that is focused on in recognition by the machine learning model.

In at least one embodiment, there is described a case in which a CNN is an example of the machine learning model and a heat map in which the portion to serve as the basis for classification is visualized is generated. The CNN classifies the input image, and the heat map is generated by using a method called Grad-CAM. That is, in at least one embodiment, there is described a case in which means for identifying the input image and means for generating the heat map are different from each other.

Figure 3:
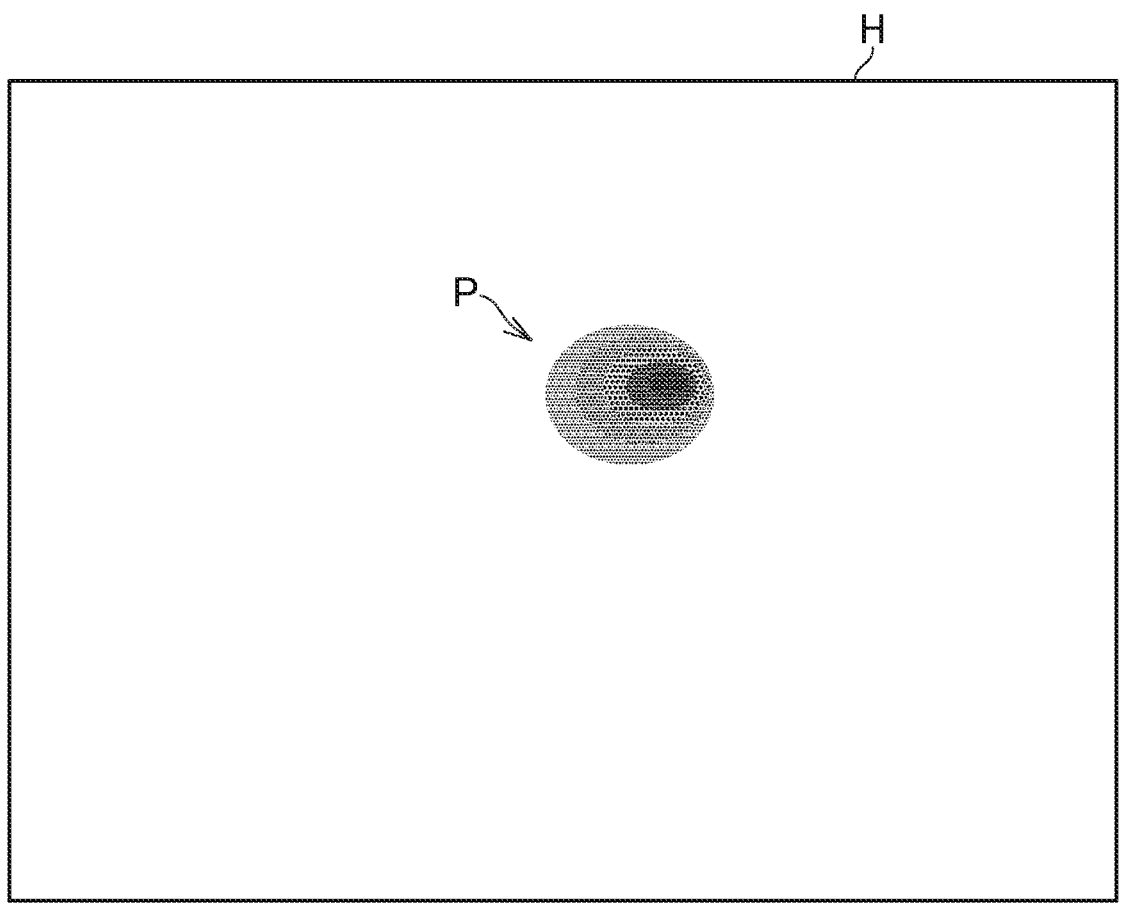
FIG. 3 is a diagram for illustrating an example of a heat map.

FIG. 3 is a diagram for illustrating an example of the heat map. A heat map H of FIG. 3 shows a feature portion to serve as the basis for classification by the machine learning model when the teacher image I1 of FIG. 2 is input to the machine learning model as an input image. For example, the heat map H is an image having the same size as that of the input image, and has a darker color when the feature is more distinctive. In FIG. 3, the color in the heat map H is schematically represented by halftone dots. As the density of the halftone dots becomes higher, the color becomes darker, and as the density of the halftone dots becomes lower, the color becomes lighter.

In at least one embodiment, the feature portion is a portion of the heat map H in which the color is a predetermined darkness or deeper. In the example of FIG. 3, a portion having the symbol "P" represented by halftone dots is the feature portion. For example, the feature portion P is near the nose of the dog illustrated in the teacher image I1, which is the input image. This means that the feature near the nose of the dog has been strongly learned by the machine learning model.

Meanwhile, a color is not displayed in the heat map H for the ears and the torso of the dog. This means that the features of the ears and the torso of the dog have not been learned by the machine learning model. In the current machine learning model, classification is performed based on only a feature near the nose of the dog. Therefore, when other features such as the ears and the torso can be learned, the accuracy of the machine learning model can be improved. Therefore, the data augmentation system S of at least one embodiment acquires a processed image by processing the teacher image I1 as the input image so that the feature near the nose of the dog is reduced or disappears.

Figure 4:
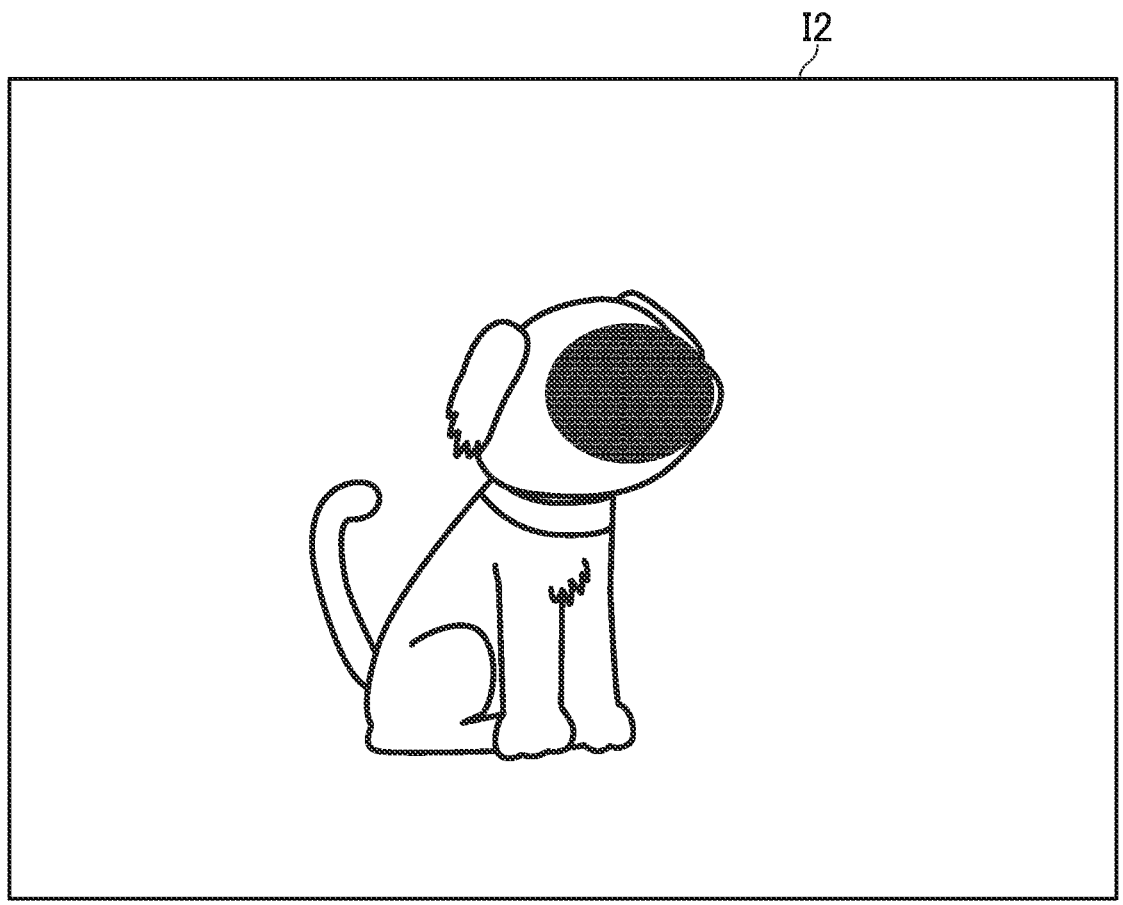
FIG. 4 is a diagram for illustrating an example of a processed image.

FIG. 4 is a diagram for illustrating an example of the processed image. As illustrated in FIG. 4, there is illustrated a processed image 12 in which the feature portion P of the teacher image I1, which is the input image, is masked and the feature near the nose of the dog has disappeared. In the processed image 12, the feature near the nose has disappeared, and hence features such as the ears and the torso appear relatively strongly. Therefore, when a pair of the processed image 12 and classification information indicating a dog is used as new teacher data, features such as the ears and the torso of the dog can be learned.

As described above, even when the user has not prepared a new teacher image, the data augmentation system S can implement efficient data augmentation by acquiring the processed image 12 based on the existing teacher image I1 and using the acquired processed image 12 as a new teacher image. In the following description, the data augmentation system S is described in detail. Further, the reference symbols of the teacher image I1, the processed image 12, and the like are omitted unless it is particularly required to refer to the drawings.

3. Functions to be Implemented by Data Augmentation System

Figure 5:
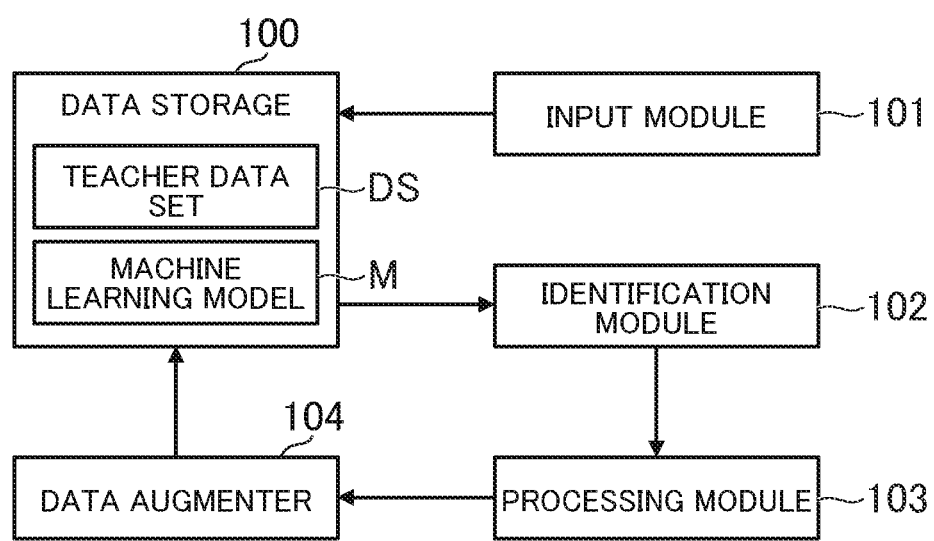
FIG. 5 is a functional block diagram for illustrating an example of functions to be implemented by the data augmentation system.

FIG. 5 is a functional block diagram for illustrating an example of functions to be implemented by the data augmentation system S. As illustrated in FIG. 5, in the data augmentation system S, a data storage 100, an input module 101, an identification module 102, a processing module 103, and a data augmenter 104 are implemented. In at least one embodiment, there is described a case in which each of those functions is implemented by the server 10.

[3-1. Data Storage]

The data storage 100 is implemented mainly by the storage 12. The data storage 100 is configured to store the data required in order to execute the processing described in at least one embodiment. In this case, a teacher data set DS and a machine learning model M are described as examples of the data stored in the data storage 100.

FIG. 6 is a table for showing a data storage example of the teacher data set DS. As shown in FIG. 6, a plurality of pieces of teacher data are stored in the teacher data set DS. Each piece of data is a pair of a teacher image and classification information. In FIG. 6, the teacher data set DS is shown in a table format, and each record corresponds to a piece of teacher data.

In FIG. 6, the classification information is represented by using character strings such as "dog" and "cat", but the classification information may also be represented by using symbols or numerical values for those objects. The teacher image corresponds to input (question) to the machine learning model M, and the classification information corresponds to output (answer) from the machine learning model M.

In at least one embodiment, before data augmentation is performed, the teacher data set DS includes only the plurality of pieces of teacher data prepared by the user. Subsequently, when data augmentation is performed by the data augmenter 104 described later, the teacher data set DS includes the plurality of pieces of teacher data prepared by the user and at least one piece of teacher data added by the data augmentation.

The data storage 100 stores programs (algorithms) and parameters of the machine learning model M. In this case, there is described a case in which a machine learning model M learned (parameter-adjusted) by the teacher data set DS is stored in the data storage 100, but a machine learning model M before learning (before parameter adjustment) may be stored in the data storage 100.

[3-2. Input Module]

The input module 101 is implemented mainly by the controller 11. The input module 101 is configured to input an input image to the machine learning model M performing recognition. For example, when the input image is input, the machine learning model M calculates a feature amount of the input image, classifies the input image based on the calculated feature amount, and outputs classification information indicating the classification to which the input image belongs. One piece of classification information may be output, or a plurality of pieces of classification information may be output.

As described above, in place of outputting classification information indicating the classification to which the input image belongs, the machine learning model M may output a score of each of a plurality of learned classifications. In this case, the input image belongs to the classification having the highest score or to the classification having a score equal to or larger than a threshold value.

The machine learning model M in at least one embodiment is obtained by learning a teacher data set DS including a plurality of pieces of teacher data, and the input image is any one of the teacher images included in the teacher data set DS. That is, the input image is any one of the teacher images learned by the machine learning model M.

The input module 101 selects any one of the teacher images to be processed from among the teacher data set DS stored in the data storage 100, and inputs the selected teacher image to the machine learning model M as the input image. For example, the input module 101 may select a teacher image specified by the user or may randomly select a teacher image. Further, for example, the input module 101 may select a teacher image that has not been processed by the processing module 103, or may select a teacher image in which the number of acquired processed images is less than a threshold value.

The input image may be any image input to the machine learning model M, and may be an image that has not been learned by the machine learning model M yet. In this case, of the teacher data set DS, a teacher image that has not yet been learned may correspond to the input image, or an image stored separately from the teacher data set DS may correspond to the input image. For example, an image not yet included in the teacher data set DS may be uploaded from the user terminal 20 and input as the input image.

[3-3. Identification Module]

The identification module 102 is implemented mainly by the controller 11. The identification module 102 is configured to identify a feature portion of the input image to serve as the basis for recognition by the machine learning model M to which the input image has been input. As described above, in at least one embodiment, there is described a case in which the machine learning model M for performing recognition and the means for generating the heat map H are separate from each other, and the feature portion is identified by using a method called Grad-CAM.

In Grad-CAM, a change in gradient is added to any position in a feature map calculated by the machine learning model M, and based on the magnitude of the change in the output generated at that time, an important position to serve as the basis for the recognition by the machine learning model M is identified. This method focuses on the fact that a position having a large influence on the recognition by the machine learning model M has a large change in gradient. For example, the identification module 102 acquires the recognition result (for example, a classification score) last output by the machine learning model M, and then generates the heat map H based on the recognition result and a feature map, which is an intermediate output of the machine learning model M.

As the method of generating the heat map H by using Grad-CAM, 20 a known method can be used, and therefore details including the mathematical expressions to be used when the heat map H is generated are omitted here arxiv.org/abs/1610.02391, "Grad-CAM: Visual Explanations from Deep Networks via Gradient-Based Localization"). In place of Grad-CAM, the heat map H may also be generated by using Grad-CAM++, Guided-Grad-CAM, or Smooth-Grad.

As described above, the identification module 102 identifies the feature portion based on the recognition result output from the machine learning model M In at least one embodiment, the machine learning model M is a model (for example, CNN) including at least one or more convolutional layers, and hence the identification module 102 identifies a feature portion further based on a feature map output from the convolutional layers. The machine learning model M may also be a model that does not include a convolutional layer. In this case, the identification module 102 identifies the feature portion based on the recognition result output from the machine learning model M without using a feature map. For example, when an RNN or a Faster-RNN, which are mainly used in language analysis and do not include a convolutional layer, is used as the machine learning model M, the identification module 102 identifies the feature portion based on the recognition result output from the machine learning model M.

In FIG. 3, there is illustrated an example of the heat map H in order to visualize the output of the machine learning model M. However, the machine learning model M may output any information corresponding to the heat map H. For example, the machine learning model M may output a numerical value indicating the probability (chance) of being a feature portion for each pixel or area of the input image. A larger numerical value means that the portion is more distinctive. The heat map H of FIG. 3 can be referred to as a representation of this numerical value as an image. The machine learning model M may also output only coordinate information indicating the position of a candidate portion, without particularly outputting a numerical value indicating the probability.

For example, the identification module 102 identifies, as the feature portion, a portion of the input image in which the numerical value indicating a probability as a feature portion is equal to or larger than a threshold value. For example, in the example of FIG. 3, of the input image, the identification module 102 identifies the colored portion in the heat map H as the feature portion. It is not required that the identification module 102 identify all of the colored portions as the feature portions. For example, the portion having the lightest color may not be identified as being the feature portion, and only the darkest portion may be identified as being the feature portion.

The identification method for the feature portion is not limited to a method using Grad-CAM. A known method can be applied as the identification method for the feature portion. For example, when a machine learning model M capable of identifying a bounding box indicating an area having high physical properties is used, the identification module 102 may identify the inside of the bounding box as the feature portion.

The identification module 102 may identify a part in the bounding box as the feature portion in place of identifying the bounding box as a whole as the feature portion. For example, the identification module 102 may perform edge processing in the bounding box to extract the contour lines of the object, and identify the inside of those contour lines as the feature portion, or may identify only the area near the center of the bounding box as the feature portion.

[3-4. Processing Module]

The processing module 103 is implemented mainly by the controller 11. The processing module 103 is configured to acquire a processed image by processing at least a part of the feature portion. The processed image is a separate image from the input image, and therefore the processed image is generated (newly created, or renamed and saved) as a separate image (separate data) from the input image rather than acquired by overwriting the input image.

For example, there is now described a case in which the processing module 103 acquires the processed image by performing mask processing on at least a part of the feature portion. In mask processing, a specific portion in the image is extracted (in other words, a specific portion in the image is hidden). Mask processing may also be referred to as "masking". Known image processing may be used for the mask processing. In this case, there is described an example in which a mask image (reference image) indicating a portion to be extracted is used. In at least one embodiment, there is described a case in which the entire feature portion is processed, but as in a modification example described later, only a part of the feature portion may be processed.

For example, the processing module 103 creates a mask image having the same size as that of the input image. The mask image is a binary image in which the feature portion is black and the other portions are white. For example, black indicates a portion not to be extracted (portion to be masked), and white indicates a portion to be extracted (portion not to be masked). When the images of FIG. 2 to FIG. 4 are taken as an example, the processing module 103 creates a mask image in which the colored area of the heat map H is black and the non-colored portion is white. The processing module 103 acquires the processed image 12 by superimposing the mask image on the teacher image I1, which is the input image, and extracting only the white portion of the mask image.

It is not required that the mask image be a binary image. The mask image may be, for example, a grayscale image or a color image. The processing by the processing module 103 is not limited to mask processing, and various processing can be applied. For example, the processing method may be any processing that reduces the feature of at least a part of the feature portion or eliminates the feature of at least a part of the feature portion.

For example, the processing module 103 may acquire the processed image by performing inpainting processing on at least a part of the feature portion. In inpainting processing, an area to be processed is painted with a surrounding color. Inpainting processing may also be referred to as "image restoration". Known image processing may be used for the inpainting processing. Here, there is described a case of painting with the color of any pixel in the periphery of the area to be processed. The word "periphery" as used here refers to the pixels adjacent to the area to be processed, or the pixels within a predetermined number of pixels from the area to be processed.

In at least one embodiment, there is described a case in which the entire feature portion is processed. Therefore, for example, the processing module 103 acquires the colors (pixel values) of the pixels at the periphery of the feature portion in the input image. For example, the processing module 103 acquires the color of any pixel adjacent to the feature portion or pixels within a predetermined number of pixels from the feature portion. The processing module 103 acquires the processed image by painting the inside of the feature portion with the acquired color. The color for painting the inside of the feature portion is not required to be the color of one peripheral pixel, and may be a color obtained by mixing the colors of a plurality of peripheral pixels. Further, it is not required that the inside of the feature portion be painted with a single color, and the color may be changed in accordance with the position. The processing module 103 may also be configured to paint so as to be in harmony not only the surrounding color, but also with the surrounding textures and shapes, for example (so-called content-based painting).

The processing module 103 may also perform the processing by reducing the brightness of at least a part of the feature portion. As another example, the processing module 103 may perform the processing by increasing the transparency level of at least a part of the feature portion. As yet another example, the processing module 103 may perform the processing by painting at least a part of the feature portion with a color designated by a user or a color determined in advance.

The processing module 103 may perform the processing by blurring at least a part of the feature portion. As another example, the processing module 103 may perform the processing by performing noise processing on at least a part of the feature portion. As yet another example, the processing module 103 may perform the processing by mapping a texture onto at least a part of the feature portion.

[3-5. Data Augmenter]

The data augmenter 104 is implemented mainly by the controller 11. The data augmenter 104 is configured to perform data augmentation based on the processed image. For example, the data augmenter 104 generates teacher data based on the processed image to perform data augmentation.

In at least one embodiment, the teacher data is a pair of a teacher image and classification information. Therefore, as the teacher data, the data augmenter 104 acquires a pair of a processed image and classification information indicating the classification of the input image from which the processed image is acquired. The classification information may be classification information output when the input image is input to the machine learning model M, or may be classification information stored in the teacher data set DS.

The data augmenter 104 performs the data augmentation by adding the acquired teacher data to the teacher data set DS. For example, the data augmenter 104 performs the data augmentation based on the processed image on which mask processing has been performed. For example, the data augmenter 104 performs the data augmentation by acquiring as the teacher data a pair of the processed image on which mask processing has been performed and the classification information, and adding the acquired teacher data to the teacher data set DS.

As yet another example, the data augmenter 104 performs the data augmentation based on the processed image on which inpainting processing has been performed. For example, the data augmenter 104 performs the data augmentation by acquiring as the teacher data a pair of the processed image on which inpainting processing has been performed and the classification information, and adding the acquired teacher data to the teacher data set DS.

In place of adding the acquired teacher data to the existing teacher data set DS, the data augmenter 104 may perform the data augmentation by newly generating a teacher data set including the acquired teacher data. For example, a learned machine learning model may undergo additional learning based on the newly generated teacher data set. As another example, an unlearned machine learning model may newly undergo learning based on the existing teacher data set DS and the newly generated teacher data set.

4. Processing to be Executed in at Least One Embodiment

Figure 7:
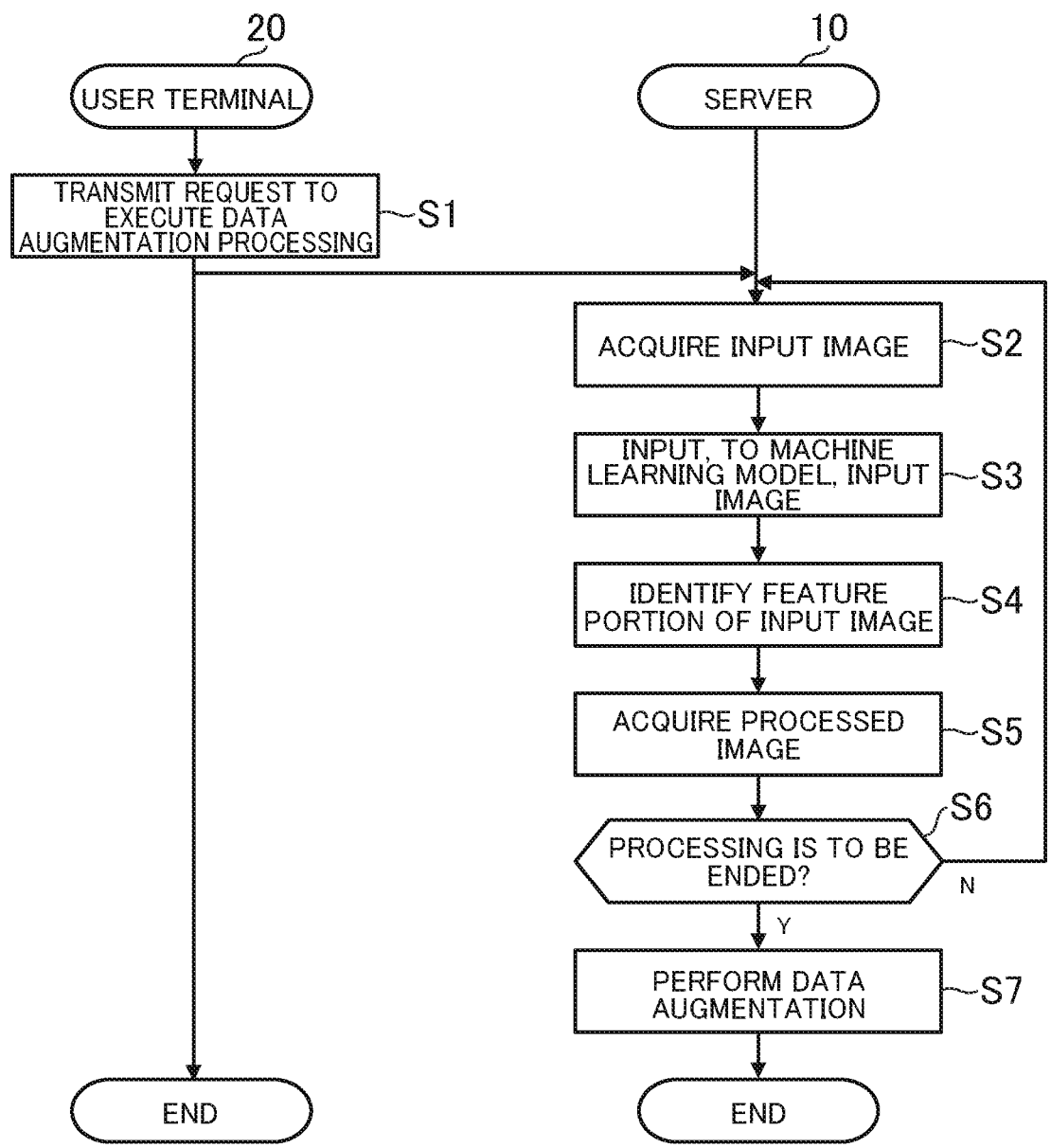
FIG. 7 is a flowchart for illustrating an example of processing to be executed in the data augmentation system.

FIG. 7 is a flowchart for illustrating an example of processing to be executed in the data augmentation system S. The processing illustrated in FIG. 7 is executed by the controllers 11 and 21 operating in accordance with programs stored in the storages 12 and 22. The processing described below is an example of the processing to be executed by the functional blocks illustrated in FIG. 5. When the processing described below is executed, it is assumed that the user has created a teacher data set DS and uploaded the created teacher data set DS to the server 10. It is also assumed that the machine learning model M has already learned the teacher data set DS.

As illustrated in FIG. 7, first, in the user terminal 20, the controller 21 transmits a request to execute data augmentation processing (Step S1). The execution request is issued by transmitting data having a predetermined format. The execution request is transmitted when the user performs a predetermined operation from the operation device 24. In at least one embodiment, there is described a case in which all the teacher images for which a processed image has not yet been acquired are to be processed. When the user selects a teacher image for acquiring a processed image, the execution request may include information for identifying the teacher image selected by the user. The data augmentation processing may be executed when a predetermined timing has arrived in place of when instructed to be executed by the user.

In the server 10, when the execution request is received, the controller 11 acquires, as an input image, any one of the teacher images stored in the teacher data set DS (Step S2). In Step S2, the controller 11 acquires, as an input image, any one of the teacher images for which a processed image has not yet been acquired from among the teacher images stored in the teacher data set DS. Whether or not a processed image has been acquired is managed based on information such as the file name and a flag of the teacher image.

The controller 11 inputs the input image to the machine learning model M (Step S3). In Step S3, when the input image is input to the machine learning model M, the machine learning model M calculates a feature amount of the input image, and outputs classification information indicating the classification of the input image based on the feature amount.

The controller 11 identifies the feature portion of the input image by using Grad-CAM (Step S4). In Step S4, the controller 11 acquires the heat map H based on the classification result output from the machine learning model M and a feature map output from the convolutional layers, and identifies a portion in which the pixel value is within a predetermined range (colored portion) as the feature portion.

The controller 11 acquires the processed image by performing mask processing on the feature portion identified in Step S4 (Step S5). In Step S5, the controller 11 acquires the processed image by generating a mask image in which the feature portion is black and the portions other than the feature portion are white, and superimposing the mask image on the input image.

The controller 11 determines whether or not to end the processing (Step S6). In Step S6, the controller 11 determines whether or not processed images have been acquired for all of the teacher images. When there is a teacher image for which a processed image has not yet been acquired, the controller 11 does not determine that the processing is to be ended. When processed images have been acquired for all of the teacher images, the controller 11 determines that the processing is to be ended.

When it is not determined that the processing is to be ended (Step S6: N), the processing returns to Step S2, and the processing of Step S2 to Step S5 is executed through use of the next teacher image as the input image. Meanwhile, when it is determined that the processing is to be ended (Step S6: Y), the controller 11 performs data augmentation based on the processed image (Step S7), and the processing ends. In Step S7, the controller 11 acquires, as the teacher data, the pair of the processed image and the classification information and adds the acquired teacher data to the teacher data set DS.

After the data augmentation in Step S7 has been performed, the server 10 executes the learning of the machine learning model M based on the teacher data set DS on which the data augmentation has been performed. For example, the server 10 adjusts a parameter of the machine learning model M such that a relationship between the input and the output of the teacher data included in the teacher data set DS can be obtained. Various known methods can be used for the learning itself. For example, a method used in a neural network or the like may be used.

According to the data augmentation system S described above, efficient data augmentation can be implemented by identifying a feature portion to serve as the basis for recognition by the machine learning model M, and acquiring a processed image by processing at least a part of the feature portion. When inefficient data augmentation as described in the related art is performed, a large number of teacher images are required in order to obtain sufficient learning accuracy, and hence there is a possibility of increased memory consumption and longer learning processing time. In this regard, according to the data augmentation system S, only teacher images that are effective for learning are acquired, and this configuration prevents teacher images having little or no learning effect from being acquired. As a result, at least one of reduced memory consumption and an increased learning speed can be effectively implemented. Further, the server 10 is not required to execute unnecessary processing, and hence the processing load on the server 10 can also be reduced. As another example, the user is only required to prepare a certain amount of teacher data first, and it is not required to prepare a large amount of teacher data. As a result, the time and effort required by the user can be reduced. The same applies to cases in which data other than images is used.

Through execution of mask processing on at least a part of the feature portion and execution of data augmentation based on the processed image on which mask processing has been performed, a feature learned by the machine learning model M can be masked, and the machine learning model M can efficiently learn another feature. As a result, the machine learning model M can perform classification based on various features, and the accuracy of the machine learning model M can be improved.

Through execution of inpainting processing on at least a part of the feature portion and execution of data augmentation based on the processed image on which inpainting processing has been performed, a feature learned by the machine learning model M can be painted, and the machine learning model M can efficiently learn another feature. As a result, the machine learning model M can perform classification based on various features, and the accuracy of the machine learning model M can be improved.

The accuracy of identifying the feature portion can be further increased by identifying the feature portion based on the recognition result output from the machine learning model M and identifying the feature portion by using the actual recognition result. In addition, the flexibility of the machine learning model M can be increased by configuring such that the machine learning model M is separate from the means for generating the heat map H. As a result, a machine learning model M meeting the objective of the user can be applied.

The accuracy of identifying the feature portion can also be further increased by using a model including a convolutional layer and identifying the feature portion based further on a feature map output from the convolutional layer. As a result, more efficient data augmentation can be implemented, and at least one of reduced memory consumption and an increased learning speed can be implemented. In addition, when Grad-CAM having an improved algorithm is used, the feature portion can be identified relatively quickly, and hence the data augmentation processing can be speeded up. As a result, the processing load on the server 10 can be reduced.

Further, the existing teacher data set DS can have a richer variation in content by adding teacher data including the processed image to the teacher data set DS already learned in the machine learning model M and performing data augmentation. As a result, the accuracy of the classification can be effectively improved.

5. Modification Examples

Aspects of the present invention is not limited to at least one embodiment described above, and can be modified suitably without departing from the spirit of the aspects of the present invention.

(1) For example, in at least one embodiment, there is described a case in which the entire feature portion is processed, but only a part of the feature portion may be processed. The processing module 103 in Modification Example (1) of the present invention selects a part of the feature portion as the portion to be processed, and acquires processed data by processing the selected portion to be processed. The portion to be processed is, of the feature portion, the part on which processing is to be performed. Processing is not performed on portions of the feature portion other than the portion to be processed.

The portion to be processed may be selected by any method. In this example, there is described a case in which the portion to be processed is selected based on a numerical value indicating the probability of the feature portion. This numerical value corresponds to a score calculated for each area in the feature portion. The score is a numerical value indicating the probability that a portion is a distinctive portion (portion recognizable by the machine learning model M), which is different from the probability of belonging to a classification. Therefore, this score can be referred to as a numerical value indicating the strength of the feature.

The processing module 103 selects the portion to be processed based on the score calculated for each area in the feature portion. Similarly to at least one embodiment, there is described a case in which the heat map H is output by using Grad-CAM. The color indicated by the heat map H corresponds to a numerical value indicating the probability of the feature portion, and hence the processing module 103 acquires the processed image by selecting the portion to be processed based on the color in the heat map H.

Figure 8:
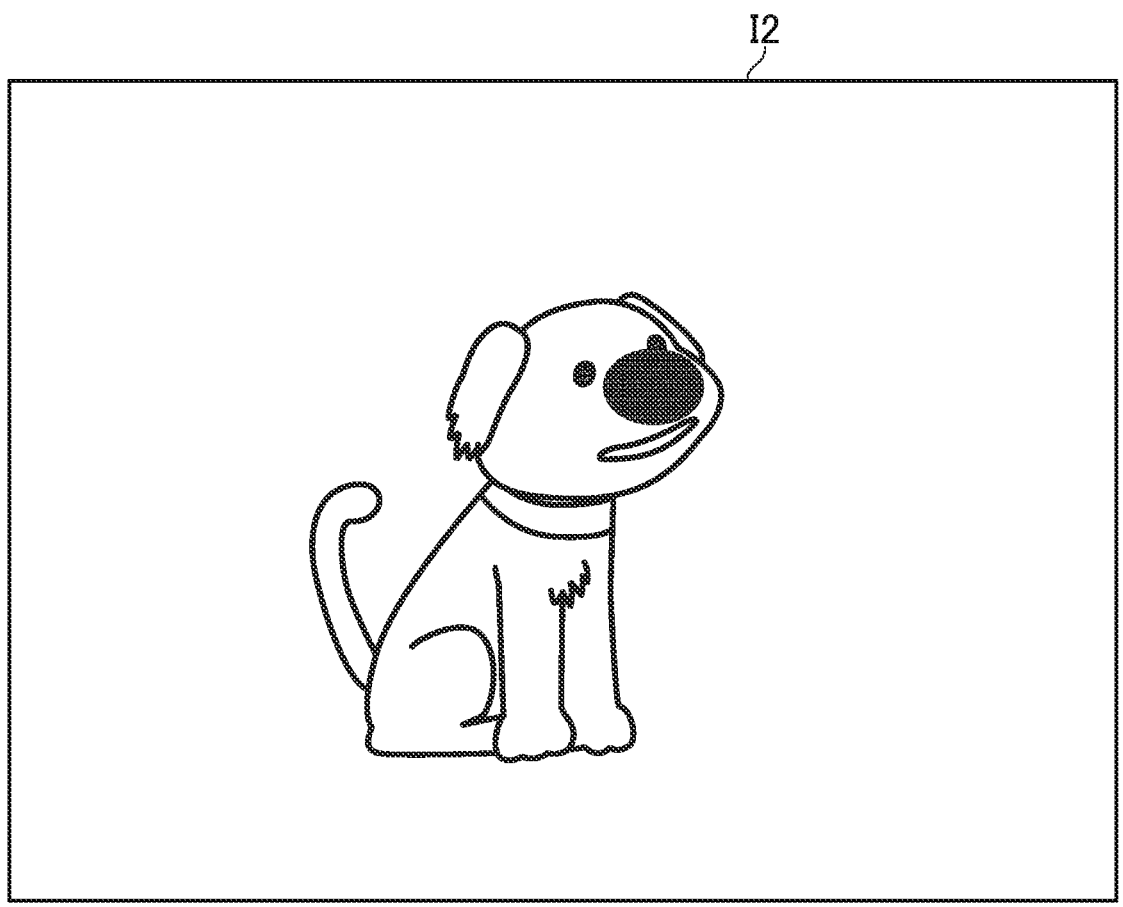
FIG. 8 is a diagram for illustrating a processed image in Modification Example (1) of the present invention.

FIG. 8 is a diagram for illustrating the processed image 12 in Modification Example (1). There is described here a case in which the heat map H of FIG. 3 is output when the teacher image I1 illustrated in FIG. 2 is input to the machine learning model M as an input image. As illustrated in FIG. 8, the processing module 103 does not select the whole feature portion (colored portion in the heat map H), but selects a part thereof as the portion to be processed. For example, the processing module 103 selects, as the portion to be processed, a portion in which the numerical value indicating the probability of the feature portion is equal to or larger than a threshold value.

For example, when it is assumed that the color density is indicated in five levels in the heat map H, the processing module 103 selects the portions up to the third level in order of darker color as the portion to be processed, and does not select the fourth level and the fifth level as the portion to be processed. The method of selecting the portion to be processed is not limited to the example of FIG. 8, but the processing module 103 is only required to select a part of the candidate portion as the portion to be processed. For example, the processing module 103 may select only the darkest portion as the portion to be processed, or may select only the lightest portion as the portion to be processed. The method of processing the portion to be processed is as described in at least one embodiment.

In Modification Example (1), more efficient data augmentation can be implemented by selecting a part of the feature portion as the portion to be processed, and processing the selected portion to be processed to acquire processed data. For example, in the feature portion, there may be portions to be processed and portions not to be processed (portions that have not yet been learned). In this regard, through processing of only a part of the feature portion rather than processing of the whole feature portion, an unprocessed portion can be included in new teacher data and learned by the machine learning model M.

Further, through selection of the portion to be processed based on a score calculated for each area in the feature portion, the portions to be processed and the portions not to be processed can be accurately distinguished from each other, and the accuracy of the portions to be processed can be improved. As a result, more efficient data augmentation can be implemented.

(2) Further, for example, in at least one embodiment and Modification Example (1), there is described a case in which one processed image is acquired for one input image, but a plurality of processed images may be acquired for one input image. In this case, data augmentation does not occur even when a plurality of the same processed images are acquired, and therefore it is assumed that in this case a plurality of processed images having a different content from each other are acquired.

The processing module 103 selects a plurality of portions to be processed that are different from each other, and acquires a plurality of processed images based on the selected plurality of portions to be processed. Each of the plurality of portions to be processed differs from the other portions in at least one of position, size, and shape. The position, size, and shape may all be different from each other, or only one or two of the position, size, and shape may be different from each other.

For example, when it is assumed that the color density is indicated in five levels in the heat map H, the processing module 103 acquires, for one input image, five processed images, namely, (a) a processed image in which only the darkest portion is the portion to be processed, (b) a processed image in which the darkest portion and the second level portion are the portion to be processed, (c) a processed image in which the darkest portion to the third level portion is the portion to be processed, (d) a processed image in which the darkest portion to the fourth level portion is the portion to be processed, and (e) a processed image in which all of the candidate portions are the portion to be processed.

As long as a plurality of processed images are acquired, the processing module 103 in Modification Example (2) of the present invention is not limited to acquiring five processed images. Any number of processed images may be acquired for one input image, and the number of acquired images may be two, three, four, or six or more. The processing module 103 may acquire a predetermined number of processed images regardless of the input image, or may determine the number of processed images based on the input image. For example, the processing module 103 may determine the number of processed images based on a distribution of the heat map H. The processing method for each portion to be processed is as described in at least one embodiment.

The data augmenter 104 performs data augmentation based on the plurality of processed images. The data augmenter 104 acquires a plurality of pieces of teacher data corresponding to each of the plurality of processed images, and performs data augmentation based on the acquired pluralities of pieces of teacher data. The method of creating each piece of teacher data is as described in at least one embodiment. The data augmentation method is different from that of at least one embodiment only in that the processing is performed on the plurality of pieces of teacher data, and the other points are the same as those in at least one embodiment.

According to Modification Example (2), the variations of the teacher data can be effectively increased by performing the data augmentation by selecting a plurality of portions to be processed that are different from each other and acquiring a plurality of pieces of processed data based on the selected plurality of portions to be processed. As a result, the accuracy of the machine learning model M can be effectively improved.

(3) Further, for example, in Modification Example (2), there is described a case in which a plurality of portions to be processed is selected based on the color density of the heat map H, but the processing module 103 may randomly select the plurality of portions to be processed from among the feature portion. In this case, the number of portions to be processed may be a fixed value or a variable value. When the number of portions to be processed is a variable value, the number of portions to be processed may be determined based on the input image.

Figure 9:
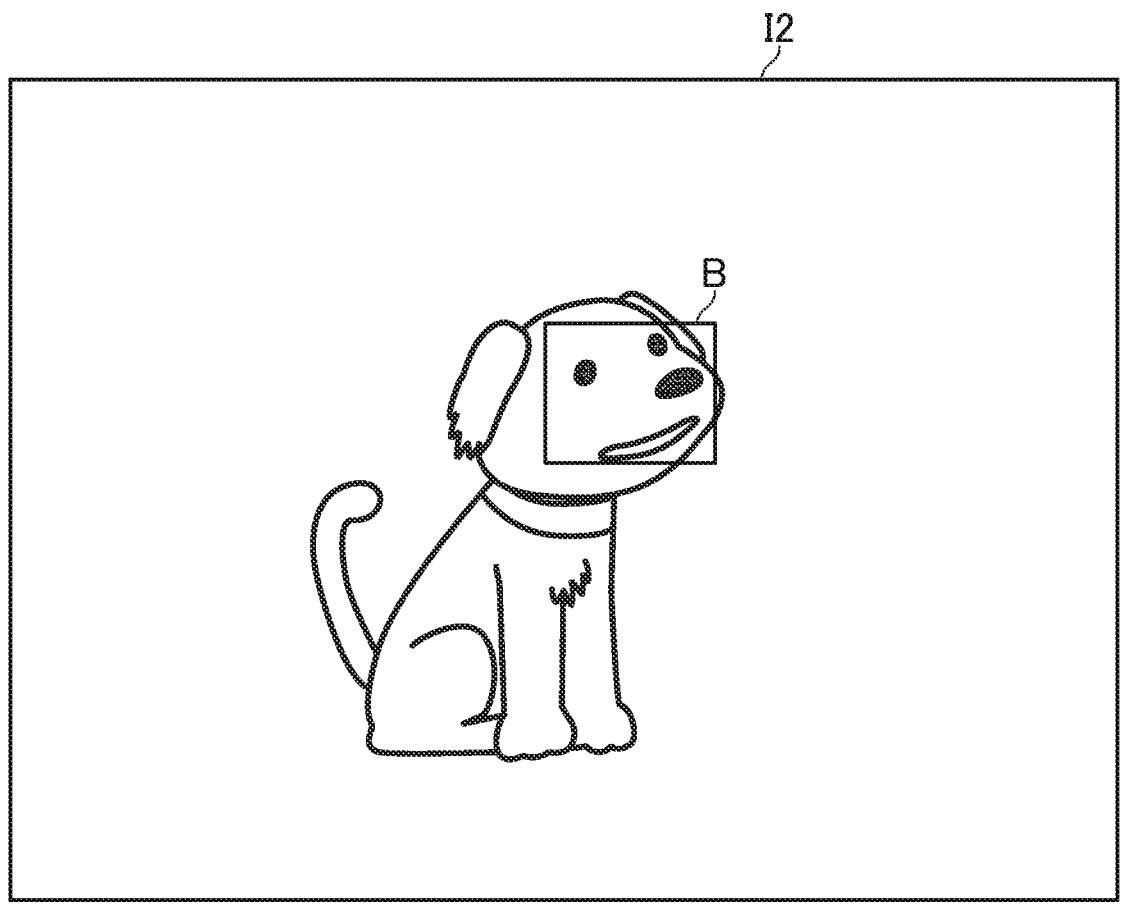
FIG. 9 is a diagram for illustrating how portions to be processed are randomly selected.
Figure 9:
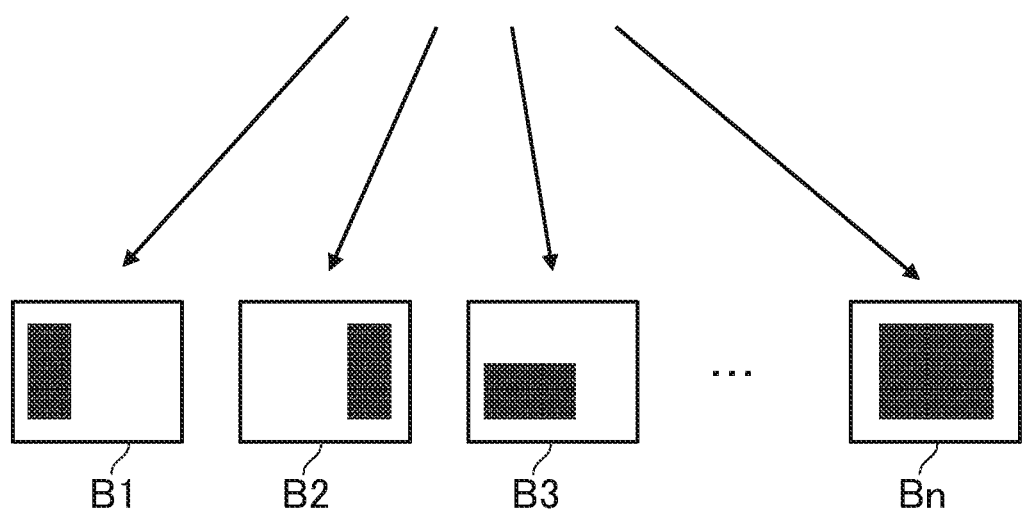

FIG. 9 is a diagram for illustrating how the portions to be processed are randomly selected. For simplicity of description, a candidate portion of the teacher image 12 as the input image is set as a bounding box B. As illustrated in FIG. 9, the processing module 103 randomly selects at least a part in the bounding box B as the portions to be processed. As indicated by reference symbols B1 to Bn (n is an integer of 2 or more, and is the total number of acquired processed images) of FIG. 9, the portions to be processed are selected such that at least one of their position, size, and shape is different from each other. In the reference symbols B1 to Bn, the portion to be processed is indicated by the dark hatching.

For example, the processing module 103 randomly selects at least one of the position, size, and shape of a portion to be processed. The processing module 103 generates a random number based on a random number generation function, and determines at least one of the position, size, and shape of the portion to be processed based on the generated random number. The relationship between the random number and the portion to be processed may be defined in a program code for selecting the portions to be processed, or may be defined as data having a format of a table or mathematical expression. The processing module 103 then repeatedly generates random numbers until a predetermined number of portions to be processed is selected, and determines at least one of the position, size, and shape of the portions to be processed. The random numbers are generated by using the current time, for example, and the values are different each time a random number is generated.

According to Modification Example (3) of the present invention, through randomly selecting a plurality of portions to be processed from among the feature portion, a plurality of portions to be processed that are different from each other can be selected based on relatively simple processing, and the processing load on the server 10 can be reduced. Further, even for a machine learning model M that does not calculate a numerical value indicating the probability of a feature portion, a plurality of portions to be processed can be selected, to thereby allow efficient data augmentation to be implemented.

(4) Further, for example, when the identification module 102 has identified a plurality of feature portions, the processing module 103 may acquire a plurality of processed images based on the plurality of feature portions, and the data augmenter 104 may perform data augmentation based on the plurality of processed images. The data augmentation method based on the plurality of processed images is as described in Modification Example (2).

Figure 10:
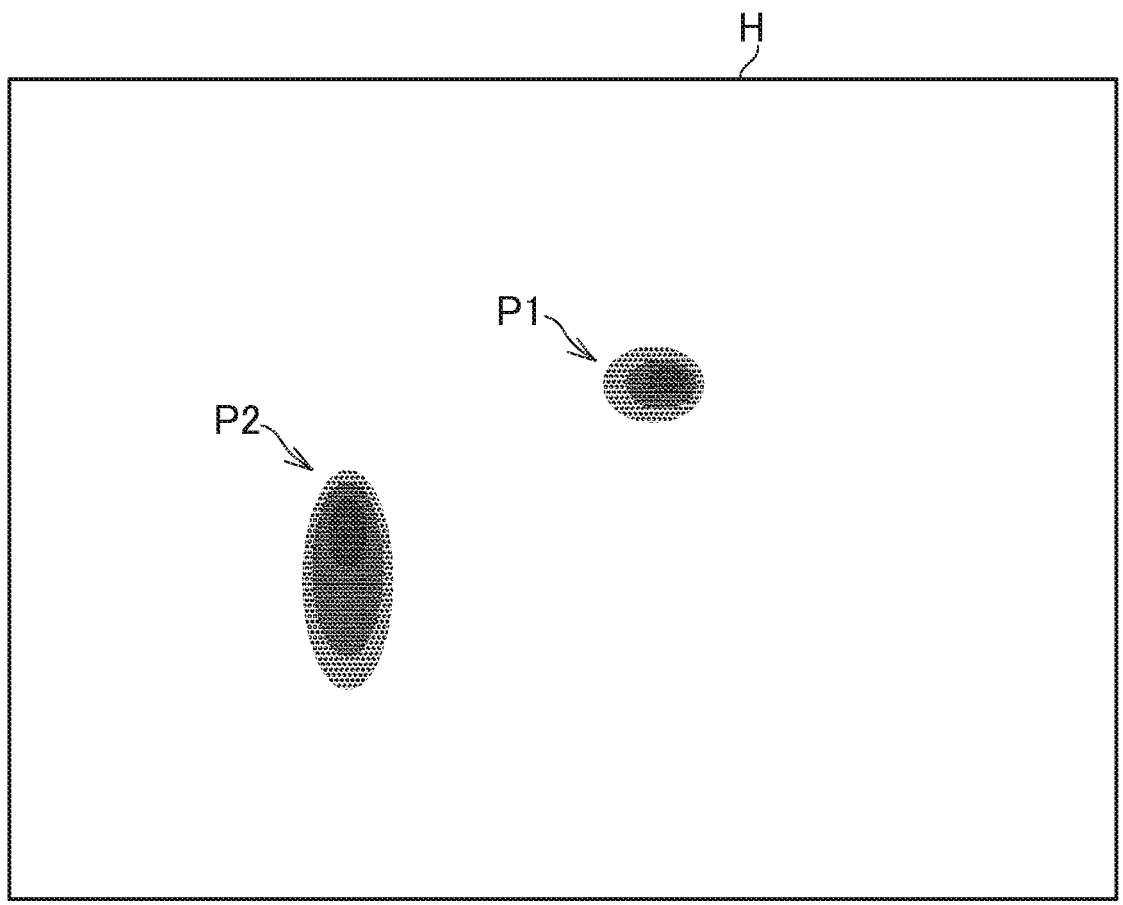
FIG. 10 is a diagram for illustrating an example of a heat map obtained when a plurality of feature portions exist in an input image.

FIG. 10 is a diagram for illustrating an example of the heat map H when a plurality of feature portions are present in the input image. As illustrated in FIG. 10, when colored feature portions P1 and P2 are present in the heat map H, the processing module 103 processes those feature portions and acquires a processed image for each feature portion. In other words, the processing module 103 acquires processed images in which different portions of the plurality of feature portions have been processed.

For example, the processing module 103 may acquire a first processed image obtained by performing mask processing only on the feature portion P1, and acquire a second processed image obtained by performing mask processing only on the feature portion P2. Further, for example, in addition to those processed images, the processing module 103 may acquire a third processed image obtained by performing mask processing on the two feature portions P1 and P2.

According to Modification Example (4) of the present invention, the variations of the teacher data can be effectively increased by acquiring a plurality of processed images based on a plurality of feature portions. As a result, the accuracy of the machine learning model M can be effectively improved.

(5) Further, for example, in at least one embodiment, there is described a case in which the means for classifying the input image and the means for generating the heat map H are separate from each other. However, those means may be integrated. That is, the machine learning model M may include both of those means.

In Modification Example (5) of the present invention, class activation mapping (CAM) is described as an example of the machine learning model M. In CAM, a global average pooling (GAP) layer is provided as a final layer, and the GAP layer outputs both the classification result of the input image and the heat map H. The GAP layer generates the heat map H by calculating an average value by convoluting a feature map filter and giving a value obtained by multiplying the calculated average value by a predetermined weighting to a softmax function. The heat map H is an example of an activation map, and may be an activation map referred to as another name.

As the method of generating the heat map H by using CAM, a known method can be used, and therefore details including the mathematical expressions in CAM arxiv.org/abs/1512.04150, "Learning Deep Features for 20 Discriminative Localization") are omitted here. In addition to CAM, the machine learning model M itself may have a function of generating the heat map H, such as in YOLO or SSD.

As described above, the machine learning model M of Modification Example (5) outputs a recognition result and a heat map H for the recognition result. The identification module 102 identifies the feature portion based on the heat map H output from the machine learning model M. For example, the identification module 102 acquires a heat map H in which the activation map is visualized, and identifies a colored portion as a feature portion.

According to Modification Example (5), the accuracy of recognizing the feature portion can be increased by providing the function of outputting the heat map H in the machine learning model M itself. For example, when CAM having an improved algorithm is used, the feature portion can be identified relatively quickly, and hence the data augmentation processing can be speeded up. As a result, the processing load on the server 10 can be reduced.

(6) Further, for example, the modification examples described above may be combined.

Further, for example, the processing module 103 may cut out only the feature portion from the input image and acquire a processed image by processing the cut-out part. As another example, the processing module 103 may acquire the processed image by cutting out the portion other than the feature portion in the input image. As yet another example, the processing module 103 may determine the number of processed images to be acquired based on the heat map H. For example, when the distribution of the heat map H extends over a wide range or the color of the heat map H changes drastically, there may be many features present in the input image, and therefore more processed images may be created and more features may be learned.

Further, for example, there have been described cases in which the input data is an image. However, even when the input data has another format, data augmentation may be implemented by executing the processing described in at least one embodiment and the modification examples. For example, when the input data is a moving image, the data augmentation system S performs the data augmentation by executing the processing described in at least one embodiment and the modification examples on at least one image included in the moving image. As another example, when the input data is text or a document, the data augmentation system S may identify a character string indicating a feature portion from the text or the document, delete the character string or replace the character string with another character string, and acquire the resultant text or document as processed data. As yet another example, when the input data is audio data, the data augmentation system S may identify a waveform indicating the feature portion from the audio data, delete the waveform or reduce the amplitude, and acquire the resultant audio data as processed data.

There has been described a case in which the main functions are implemented by the server 10, but each function may be shared by a plurality of computers. For example, functions may be shared between the server 10 and the user terminal 20. For example, the processing by the machine learning model M may be executed by the user terminal 20 in place of the server 10. Further, for example, when the data augmentation system S includes a plurality of server computers, the functions may be shared by those plurality of server computers. In addition, for example, the data described as being stored in the data storage 100 may be stored by a computer other than the server 10. While there have been described what are at present considered to be certain embodiments of the present invention, it will be understood that various modifications may be made thereto, and it is intended that the appended claims cover all such modifications as fall within the true spirit and scope of the embodiments.

What is claimed is:

1. A data augmentation system, comprising:
   at least one processor,
   at least one memory, the memory having instructions stored thereon which causes the at least one processor to:
   input, to a machine learning model configured to perform recognition, input data;
   identify a feature portion of the input data to serve as a basis for recognition by the machine learning model in which the input data is used as input;
   acquire processed data by processing at least a part of the feature portion; and
   perform data augmentation based on the processed data.

2. The data augmentation system according to claim 1, wherein the memory having instructions stored thereon further causes the at least one processor to:
   select a part of the feature portion as a portion to be processed; and
   acquire the processed data by processing the selected portion to be processed.

3. The data augmentation system according to claim 2, wherein the memory having instructions stored thereon further causes the at least one processor to select the portion to be processed based on a score calculated for each area in the feature portion.

4. The data augmentation system according to claim 2, wherein the memory having instructions stored thereon further causes the at least one processor to:
   select a plurality of portions to be processed that are different from each other;
   acquire a plurality of pieces of processed data based on the selected plurality of portions to be processed; and
   perform the data augmentation based on the plurality of pieces of processed data.

5. The data augmentation system according to claim 4, wherein the memory having instructions stored thereon further causes the at least one processor to randomly select from the feature portion the plurality of portions to be processed.

6. The data augmentation system according to claim 1, wherein the memory having instructions stored thereon further causes the at least one processor to:
   identify a plurality of feature portions;
   acquire a plurality of pieces of processed data based on the plurality of feature portions; and
   perform the data augmentation based on the plurality of pieces of processed data.

7. The data augmentation system according to claim 1, wherein the input data is an input image to be input to the machine learning model, and
   wherein the memory having instructions stored thereon further causes the at least one processor to:
   identify a feature portion of the input image;
   acquire a processed image by processing at least a part of the feature portion; and
   perform the data augmentation based on the processed image.

8. The data augmentation system according to claim 7, wherein the memory having instructions stored thereon further causes the at least one processor to:
   acquire the processed image by performing mask processing on at least a part of the feature portion; and
   perform the data augmentation based on the processed image on which the mask processing has been performed.

9. The data augmentation system according to claim 7, wherein the memory having instructions stored thereon further causes the at least one processor to:
   acquire the processed image by performing inpainting processing on at least a part of the feature portion; and
   perform the data augmentation based on the processed image on which the inpainting processing has been performed.

10. The data augmentation system according to claim 1, wherein the memory having instructions stored thereon further causes the at least one processor to identify the feature portion based on a result of the recognition output from the machine learning model.

11. The data augmentation system according to claim 10, wherein the machine learning model is a model including at least one or more convolutional layers, and
    wherein the memory having instructions stored thereon further causes the at least one processor to identify the feature portion further based on a feature map output from the at least one or more convolutional layers.

12. The data augmentation system according to claim 1, wherein the machine learning model is configured to output a result of the recognition and an activation map for the result of the recognition, and
    wherein the memory having instructions stored thereon further causes the at least one processor to identify the feature portion based on the activation map.

13. The data augmentation system according to claim 1, wherein the machine learning model has a teacher data set including a plurality of pieces of teacher data learned therein,
    wherein the input data is included in the teacher data set, and
    wherein the memory having instructions stored thereon further causes the at least one processor to perform the data augmentation by adding teacher data including the processed data to the teacher data set.

14. The data augmentation system according to claim 1, wherein the memory having instructions stored thereon further causes the at least one processor to generate a heat map from the input data using a Grad-CAM method, and wherein the heat map is used to identify the feature portion.

15. A data augmentation method, comprising:
inputting, to a machine learning model configured to perform recognition, input data;
identifying a feature portion of the input data to serve as a basis for recognition by the machine learning model in which the input data is used as input;
acquiring processed data by processing at least a part of the feature portion; and
performing data augmentation based on the processed data.

16. A non-transitory information storage medium having stored thereon a program for causing a computer to:
input, to a machine learning model configured to perform recognition, input data;
identify a feature portion of the input data to serve as a basis for recognition by the machine learning model in which the input data is used as input;
acquire processed data by processing at least a part of the feature portion; and
perform data augmentation based on the processed data.

* * * * *